United States Patent [19]

Schurk

[11] Patent Number: 4,964,076
[45] Date of Patent: Oct. 16, 1990

[54] SYSTEM FOR CONTROLLING DATA BUS COMMUNICATIONS OF A DATA BUS FOR VEHICLES

[75] Inventor: Hans-Eberhard Schurk, Markt Indersdorf, Fed. Rep. of Germany

[73] Assignee: Bayerische Motoren Werke AG, Fed. Rep. of Germany

[21] Appl. No.: 351,274

[22] Filed: May 5, 1989

Related U.S. Application Data

[63] Continuation of Ser. No. 911,759, Sep. 26, 1986, abandoned.

[30] Foreign Application Priority Data

Sep. 26, 1985 [DE] Fed. Rep. of Germany ....... 3534216

[51] Int. Cl.⁵ .......................... G06F 13/36; H04J 3/02
[52] U.S. Cl. .................................. 364/900; 340/825.5; 364/925; 364/932.8; 364/940; 364/940.1; 364/940.2
[58] Field of Search ... 364/200 MS File, 900 MS File; 340/825.06, 825.07, 825.15, 825.5; 370/80, 82, 85; 307/9.1, 10.1

[56] References Cited

U.S. PATENT DOCUMENTS

| | | | |
|---|---|---|---|
| 4,149,144 | 4/1979 | Diefenderfer | 370/85 |
| 4,402,040 | 8/1983 | Evett | 364/200 |
| 4,497,026 | 1/1985 | Braschel et al. | 364/426 |
| 4,580,261 | 4/1986 | Pelotte | 370/85 |
| 4,593,282 | 6/1986 | Acampora et al. | 370/85 |
| 4,620,278 | 10/1986 | Ellsworth et al. | 364/200 |
| 4,642,760 | 2/1987 | Yanai et al. | 364/200 |
| 4,679,045 | 7/1987 | Sadamori et al. | 340/825.5 |
| 4,679,192 | 7/1987 | Vanbrabant | 370/85 |
| 4,680,753 | 7/1987 | Fulton et al. | 370/85 |
| 4,715,031 | 12/1987 | Crawford et al. | 370/85 |

OTHER PUBLICATIONS

Andrew S. Tanenbaum, Computer Networks, 1981, pp. 168-171 Prentice Hall International, Inc.

Primary Examiner—Raulfe B. Zache
Attorney, Agent, or Firm—Evenson, Wands, Edwards, Lenahan & McKeown

[57] ABSTRACT

A data bus system for vehicles in which the various subsystems communicate with one another via a common data bus is provided in which the subsystems are in each case connected with the data bus via a station. The stations have registers for the storage of data required and furnished by the corresponding connected user. These stations, for the reception of the data required by the corresponding subsystem, are continuously connected to the data bus, while the stations for the sequential transmitting of the data furnished by the corresponding subsystem are sequentially connected to the data bus for a time interval equaling the length of the data to be transmitted.

30 Claims, 2 Drawing Sheets

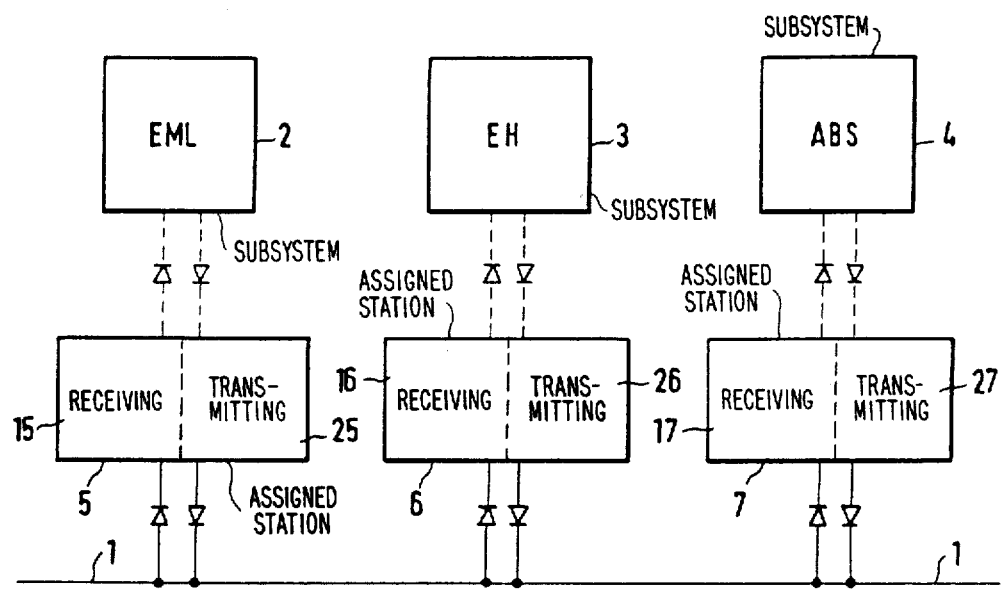
FIG. 1
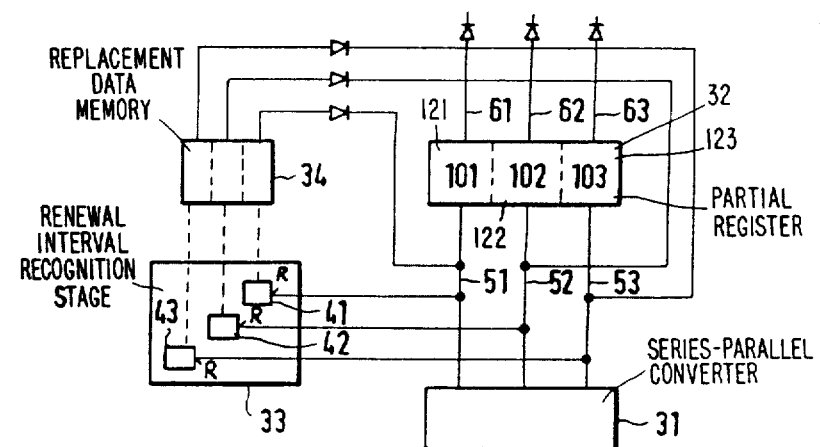
FIG. 2
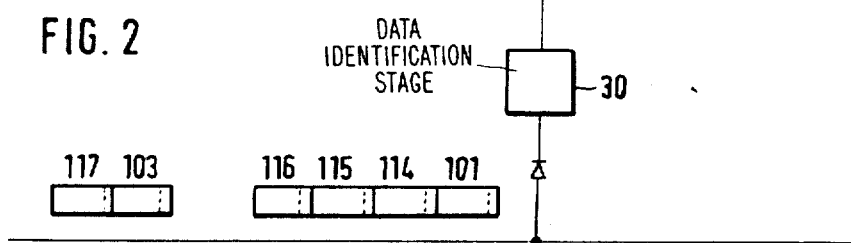

SYSTEM FOR CONTROLLING DATA BUS COMMUNICATIONS OF A DATA BUS FOR VEHICLES

This is a continuation of application Ser. No. 06/911,759, filed Sept. 26, 1988, now abandoned.

BACKGROUND AND SUMMARY OF THE INVENTION

Data bus systems for vehicles are increasing in importance with respect to vehicles. The cause is the continuously growing number of highly automated, complicated and costly subsystems that communicate with one another, in other words, exchange data. In the area of motor vehicles, for example, these types of subsystems are known as digital engine electronics, electronic hydraulic transmission control and anti-lock bus brake systems. Each of these subsystems is able to transmit data that it obtains on the basis of output signals of connected sensors or switching means and for its work requires data that are available from other subsystems.

Data bus systems of multiple designs are known. However, a problem exists in the control of the access of the subsystems to the data bus, depending upon which access method and which bus control is used. Access methods are, for example, controlled or random. In the case of the controlled access method, the access of the subsystems to the data bus is fixed by a superset control. In the random access method (CSMA = Carrier Sense Multiple Access), a transmission-ready user monitors the bus in order to determine whether at that moment another user is transmitting. If this is not the case, it will start the transmission of messages. Compared to the controlled access method, this access method has the advantage of lesser control expenditures. However, there may be unintentional transmitting by several users when they monitor the data bus at the same time (within the signal run time). So that the transmitter is certain that the message was received correctly, each message must be acknowledged by the receiver.

In order to avoid a collision of two transmitters, a modification of the above data bus system is known. In this method, known as CSMA/CD (CD = Collision Detection), the overlay of two transmitters is recognized by corresponding detectors in each transmitter. Access conflicts are eliminated by rollback attempt time intervals that differ in each transmitter. Random access methods therefore require control expenditures in order to function reliably. As compared to the controlled access methods, the random access methods have the advantage that they work independent of the number of users, whereas, in the case of a controlled access method, the number of users and their access sequence must be fixed.

In the case of a data bus system for vehicles, wherein various users communicate with one another via a common data bus, the objective arises of designing a system independently of the number of users reliably and with low expenditures with respect to control and switching technology.

In the present invention, the access of the individual users to the data bus for the transmitting and the receiving of the data is possible at any time and is ensured by the tag of the data supplied to the data bus. The transmitting of the data by the station assigned to each user takes place in an uncontrolled way to the extent that the receiver of these data is not necessarily known to the transmitting station. Concerning the transmitter, there is only a control to the extent that each user transmits its data sequentially, and the stations themselves are switched sequentially to the data bus. Similarly to the mentioned SCMA/CD method, the data bus has the advantage of modularity. The failure of a user or the absence of a user plays as little a role as the adding or the exchange of a user.

The control expenditures of this type of open system are low. They consist essentially only of controlling the sequence of the individual users for the transmitting of their data to the data bus. Advantageously, this may take place centrally. In contrast to a data bus system that is known under the name "token passing" and where the authorization to transmit is passed along from user to user, it can result in the avoidance of safety measures in the case of a user's breakdown. A safety measure of this type is known, for example, from DE 3,222,570 Al in which each user not only monitors the transmitting operation of the transmitter that precedes it in sequence, but also the transmitting operation of the transmitter preceding that transmitter.

A further improvement is achieved in preferred embodiments if the central control takes place by the station with the highest transmitting priority. In contrast to a control by a higher-ranking control unit, this results in a reduction of the expenditure with respect to components. In addition, this can ensure that, in the case of a breakdown of the control unit, the transmitting operation is controlled by the station with the then highest control priority and, as a result, a reliable transmitting operation can be maintained.

Further improvements of the data bus system are achieved if the stations send their data messages in variable lengths determined by the number of data messages to be transmitted and their length. In the case of a data bus system of that type, the data bus is occupied only to such an extent that the exchange of data is actually required. This also provides the possibility of selecting the frequency of transmission differently for each station as a function of the respective data each station transmits. If a station has data that change with different frequency, the station can transmit only the data that change frequently, whereas the data that rarely change are contained only in very few of the data messages. This frequency with which the stations transmit their data may, for example, be determined by the frequency of change of the data themselves.

In the case of a data bus system of this type, the data as a rule are filed or renewed at non-reproducible points in time. It may be advantageous in these cases for the stations to exchange these data with the pertinent user irrespectively of the frequency with which the stations are connected to the data bus for the transmitting of data or with which the data are transmitted on the data bus. It must only be ensured by corresponding replacement data or replacement data that are present in the stations that these replacement data, if the actual data fail, are used instead of the actual data.

Further objects, features, and advantages of the present invention will become more apparent from the following description when with the accompanying drawings which show, for purposes of illustration only, an embodiment in accordance with the present invention.

BRIEF DESCRIPTION OF THE DRAWINGS

FIG. 1 is a schematic view of a data bus system constructed in accordance with a preferred embodiment of the present invention;

FIGS. 2 and 3 are schematic views of components of the data bus system of FIG. 1;

DETAILED DESCRIPTION OF THE DRAWINGS

Figure 3:
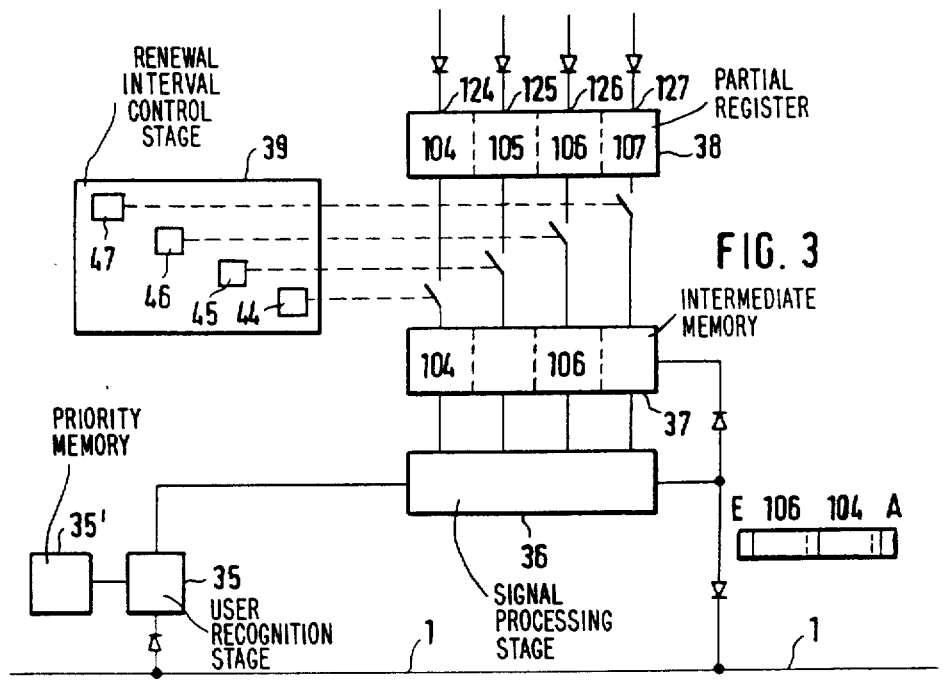

The data bus system of FIG. 1 comprises essentially a data bus 1 and several users, of which three users 2-4 are shown in FIG. 1. The users are, for example, control devices for display arrangements of operational control devices of a motor vehicle. Examples of these are an electronic engine power control (EML), an electronic transmission control (EH) and an anti-locking brake system (ABS). Each of the users 2-4, via an assigned station 5-7, is connected with the data bus 1. The stations 5-7 control the data traffic on the data bus 1 taking place in the form of an exchange of data.

Each of the users 2-3, on the one hand, has data obtained on the basis of input signals from sensors, switches, etc. (not shown) and, on the other hand, requires data existing in one or several of the other users. As an example, the instantaneous value of the wheel speed that exists, for example, in user 4, is also important for users 2 and 3. Users 2 and 3 receive this actual datum (the value of the wheel speed) via the data bus 1 from the user 4 in a way that will be explained later. As noted above, the user 4 also receives from each or at least some of the other users of the data bus, in the illustrated example, users 2 and 3, data that are important for its method of operation. This can be, for example, the torque generated by the internal-combustion engine, the value of which is furnished as a datum by the user 2, and the effective transmission switching stage, the value of which is furnished as a datum by the user 3. The user 4 obtains from these two data the value of the torque acting at the vehicle wheels and can, in the case of a slip, correspondingly reduce the torque affecting the wheels.

For carrying out the data traffic, each of the stations 5-7 has a receiving portion 15, 16, 17 and a transmitting portion 25, 26, 27. The structure and the method of operation of the receiving portions 15, 16 and 17 is shown in FIG. 2. Each of the receiving portions 15, 16, 17 has a data identification stage 30, a series-parallel converter 31, a partial register 32, a renewal internal recognition stage 33 and a set of data memories 34.

As explained in detail in the following, the stations 5-7 sequentially supply data messages to the data bus 1, in which the data furnished by each of the assigned control devices 2-4 are listed sequentially. Each datum itself is equipped with a tag.

In order to explain the function of the receiving portion, the case will be considered where three data are to be stored in the partial register 32, the tags of which are equal to the numbers 101, 102 and 103. At any arbitrary point in time, as the starting point of the consideration, a data message is present on the data bus 1 in which are contained not only the datum with the number 101 but also other data having the numbers 114 to 116 as tags is contained. The data identification stage 30 recognizes from this data message the datum with the number 101 and supplies it via the series/parallel converter 31 to the memory 121 of the partial register 32 for this datum. In the memory 121, there now exists the actual value for the datum with the number 101. The assigned user, for example, user 2, can, independently of the arrival of the respective actual datum with the number 101, call the value of this datum existing in the memory 121 and process it in a known way.

The next data message existing on the data bus 1 contains, for example, sequentially the data with the numbers 103 and 117 as tags. The data identification stage 30 recognizes the datum with the number 103 and writes it into the memory 123 for this datum. The same takes place with the next data message in which, for example, the datum with the number 102 is present as a component. This datum is stored in memory 122.

As shown, the data in the memories 121-123 are renewed constantly but independently from one another. By means of the renewal interval recognition stage 33, it can be determined if a datum is not renewed within an identified time period. This occurs if the station of the user that furnishes this datum breaks down or the transmission of this datum to the station in which this datum is required, suffers a disturbance. In such a case, by means of the replacement data memory 34, a replacement value is written into the respective memory. The replacement value allows an emergency operation of the assigned user.

The renewal interval recognition stage 33 comprise time members 41-43 that are connected to the input lines 51-53 of the memorires 121 to 123 with their reset input R. If signal traffic takes place on one of the lines 51 to 53, the respective time member 41 to 43 is reset and again starts to run. The running time of the time members 41-43 differs and is equal to the time in which the respective datum must be renewed in the memories 121-123. If this renewal takes place in time, the respective time member 41-43 is reset before it runs out. However, if this renewal does not take place in time, the time member runs out completely and causes the replacement data memory 34 to feed the respective replacement value into the memory 121-123. Located in the partial register 32 are data that were renewed in time, (within the required time period) or replacement data originating from the replacement data memory 34. The user can dispose of these data at any time independently of the data traffic on the data bus 1. For this purpose, it is connected by a corresponding number of parallel lines 61-63 with the partial register 32. If after the input of a replacement value, a current datum occurs again, it will arrive in the partial register and replace the replacement value.

The transmitting of the data furnished by each user takes place in a form that is shown as an example in FIG. 3. For this purpose, the transmitting portions 25, 26 and 27 of the station shown in FIG. 3 is used. It has a user recognition stage 35, a signal processing stage 36 comprising essentially a parallel/series converter, an intermediate memory 37 and a renewal interval control stage 39. In the memories 124-127 of the partial register 38, the data existing in the assigned users are located that, via the data bus 1, are to be forwarded to other users. These are, for example, data with the tag in the form of a number 104-107. These data, via the renewal interval control stage 39, are read into the intermediate memory 37 in indicated time intervals. The renewal interval control stage 39 comprises time switches 44-47 that, corresponding to their running time, in indicated time intervals, establish the connection of the memories of partial register 38 with the corresponding memories in the intermediate memory 37.

In the illustrated example in FIG. 3, the data with the numbers 104 and 106 are to be present in the intermediate memory 37. As soon as the user recognition stage 35 receives a transmission command via the data bus 1, the signal processing stage 36 assembles the data with the numbers 104 and 106 sequentially into a data message and feeds it to the data bus 1. At the same time as the sending of this data message, the intermediate memory 37 is reset. The composition of the data messages depends on the amount of data in the intermediate memory 37 when the transmission command, via the user recognition stage 35, reaches the signal processing stage 36.

Figure 4:
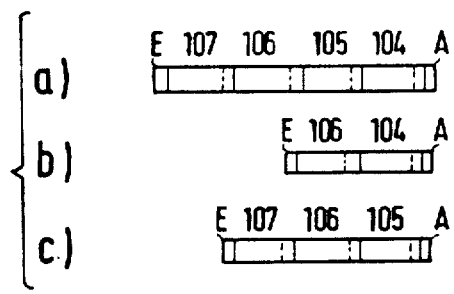
FIG. 4 shows examples of data messages that are transmitted via the data bus.

This composing of the data messages is explained in greater detail in FIG. 4. Each of the data messages has an identification character A at the start of the data message and an identification character E at the end of the data message. Between these two identification characters, the data are listed sequentially. At the respective point in time of transmission, the data messages are supplied to the data bus 1 by the individual stations. Each datum in the data message has a tag; the example of FIG. 3 represents the numbers 104 and 106.

In the following, the station of the data transfer via the data bus 1 will be discussed. All data Would be present in the intermediate memory 37 that are furnished by the corresponding user. The data message will then have the form that is shown in FIG. 4a after a first transmission command. The data numbers 104-107 are lined up sequentially and at their start are provided with the respective tag, such as the numbers 104-107. If the signal processing stage 36 subsequently receives another transmission command, the message then transmitted by it has, for example, the form that is shown in FIG. 4b. Now only the data with the numbers 104 and 106 are located in the message. The signal processing stage 36 reacts to a third transmission command by transmitting a message consisting of data having the numbers 105, 106, and 107, etc., as illustrated in FIG. 4c. The data messages are therefore from one transmission to the other different in content and length for the respective station.

The frequency with which the individual data are supplied to the data bus depends on the frequency of change of these data. Thus, for example, a datum that contains the value of a slowly changing quantity, such as the outside temperature, is important only at relatively large time intervals, whereas, for example, a datum that contains an information concerning the ignition angle of a internal combustion engine must be updated relatively frequently and supplied to the data bus.

The variable assembling of the data messages shown in diagram form in FIG. 4 has the purpose of relieving the data bus and using it only for the transport of data to the extent it is actually required for the operation of the vehicle.

The initializing of the data bus 1 and the controlling of the transmitting operation of the individual stations also takes place by means of the transmitting portion of FIG. 3. When the vehicle is started or in the idling T-M condition of the data bus, so that no data traffic takes place, the stations 5, 6, 7, for example, by means of their user recognition stage 35, are activated to send out a bus control signal. This may, for example, be a digital number value. At the same time, each of the stations scans the data bus 1. In the present case, the value is, for example, the number 00010 for station 5, the number 00001 for station 6 or the number 00100 for station 7 that is retrieved from a priority memory 35' and supplied to the data bus 1. Station 6 therefore has the highest priority since it transmits the lowest number. As soon as this number reaches the data bus, this causes the stations 5 and 7 in their transmitting operation to be controlled by station 6. However, were station 6 not to transmit at all, the control of the data bus would take place by station 5, since it has the next lowest digital number value.

Figure 5:
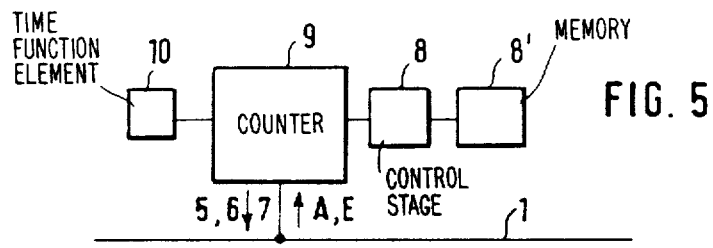
FIG. 5 is a schematic diagram showing the transmission sequence control for the data bus system.

The control of the data bus with respect to the transmitting operation for the station 6 takes place by means of the bus control stage that is shown in FIG. 5 and comprises a counter 9 and a time function element 10. The counter 9, controlled by the control stage 8, counts, for example, from 1 to 256 and supplies its respective counter reading as a transmission command to the data bus 1. This counter reading, as a transmission command, is received by the user recognition stage (35 in FIG. 3) of the individual stations and if it corresponds to the number of user, is used as a transmission command.

The identification character A of the message transmitted by the addressed user is used as the sign indicating existence of the user to the bus control stage. This bus control stage recognizes that the user having the called-up user number exists. The time function element 10 is started when an identification character A of a transmission telegram is detected. Its running time is longer than the maximum length of the data message supplied to the data bus 1. If now the identification character E of a data message arrives in the bus control station before the running-out of the time function element 10, the time function element 10 is reset and is started again with the occurrence of a new data message. With the arrival of the identification character A of the data message, the counter 9 is advanced by one unit. The new counter reading is now used as a transmission command for the station or the user with a correspnding identification character. If a user having .an identification character corresponding to the counter reading does not exist, no data message is supplied to the data bus. The control stage 8 recognizes the non-occurrence of a sign of existence and advances the counter 9 by one unit. The new counter reading is then used again as a transmission command for a user having a corresponding identification character.

If the identification character E of a data message does not arrive in the bus control stage within the running time of the time function element 10, the time function element 10 causes an advancing of the counter 9. The transmission command or the transmission authorization now goes over to the next station. The data bus therefore, even if the operation of a station is disturbed, is occupied only for the time determined by the time function element 10. After the expiration of this time, the next user is caused to transmit.

The control of the data bus may take place continously or at predetermined time intervals in the described form. In the latter case, in preferred embodiments, an additional memory 8' is present in which the user numbers of the existing users are stored. Thus, only the respective existing users will be called up and will stay called up until the control in the above-described way is carried out one time. This call up of all possible users on the data bus has the purpose of operating the data bus system with an arbitrary and variable number of users. As shown in the representation, the transmitting and the receiving of the data in each station take place independently of one another. The receiving of the data is possible at any time and depends only on the tag of these data. Also the transmitting of the data takes place variably and depends on the length of the respective data messages that are furnished by the individual stations. This length itself is variable and depends on the importance of the individual data for the operation of the vehicle.

The breakdown of a user is relatively uncritical because, due to the availability of replacement values, a limited operation of the user itself is possible. Also, the data traffic on the data bus in this case is not impaired or is impaired only insignificantly. Since the present system is an open system, the number of users is almost unlimited and may be changed, for example, during the operation time of the vehicle.

The specifics of the components illustrated in the drawings are well known and thus are not illustrated in detail.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A system controlling communications for a data bus used in vehicles, in which several users communicate with one another via a common data bus, comprising:
    individual station means for connecting each of said users to said common data bus, for receiving and transmitting continuously variable lengths of data on said common data bus,
    receiving registers at each of said individual station means for storing data received and identified as required by a corresponding user of said individual station means,
    transmitting registers at each of said individual station means for storing and providing an identification tag for each datum of said continuously variable lengths of data as furnished form said corresponding user of said individual station means, a length of said continuously variable lengths of data being a function of a renewal rate specific to each datum of data furnished from said corresponding user and a frequency of transmission of data from each of said transmitting registers to said common data bus,
    receiving means at each of said stations, constantly connected to said common data bus, for receiving and identifying said data required by said corresponding user of said station means based on said identification tag of each datum of data on said common data bus, and
    transmission means at each of said individual station means for transmitting sequentially the continuously variable lengths of data stored by an associated transmitting register, each of said transmission means being connected to said common data bus for a continuously variable time interval equaling the length of time for transmission of each datum currently stored by said transmitting register.

2. The system of claim 1, further comprising bus control means for sequentially enabling each said transmission means to transmit said data to said common data bus.

3. The system of claim 2, wherein each transmission means has separate bus control means individually controlling said common data bus.

4. The system of claim 3, wherein each said transmission means has a predetermined priority, and said bus control means of said transmission means with a highest priority upon initialization of said system controls said sequential enabling of lower priority transmission means.

5. The system of claim 4, wherein each said bus control means includes counter means for sequential counting and for supplying a transmission command corresponding to a count to said data bus, the priority of each said transmission means corresponding to a certain count.

6. The system of claim 5, wherein each said bus control means further includes means for advancing the counter means upon sensing an end of data character attached to said data transmitted by said enabled transmission means.

7. The system of claim 6, wherein each said bus control means further includes counter control means for controlling said counter means and timer means for advancing the counter means if said end of data character is not sensed after a specified time.

8. The system of claim 7, wherein each said bus control means further includes memory means for storing said priorities of each said transmission means in said system, and causing said counter means to only sequentially count through those counts corresponding to said stored priorities.

9. The system of claim 1, wherein each said transmission means includes recognition means for recognizing when said transmission means is connected to said common data bus.

10. The system of claim 9, wherein each of said transmitting registers includes a partial register means having separate memories connected to said user for individually storing each datum of data received from said corresponding user according to said identification tag thereof.

11. The system of claim 10, wherein each of said transmitting registers includes an intermediate memory means having separate memories corresponding to said separate memories of said partial register means memories for receiving each datum of said data contained in said partial register means according to said identification tag thereof.

12. The system of claim 11, wherein a data renewal interval control means for determining the renewal rate for each datum of data as furnished from a corresponding user to an associated transmitting register selectively and individually connects each separate memory of said partial register means to a corresponding separate memory of said intermediate memory means such that only data present in said partial register means at the time of connection are received by said intermediate memory means from said partial register means.

13. The system of claim 12, wherein each said transmission means includes a signal processing means which transmits data in said intermediate memory means to said common data bus when said recognition means recognizes that said transmission means is connected to said common data bus.

14. The system of claim 13, wherein said renewal interval control means selectively connects individual said partial register means memories to individual said intermediate memory means memories as a function of time.

15. The system of claim 1, wherein each said receiving means includes a data identification means for identifying said required data.

16. The system of claim 15, wherein each said receiving means further includes said receiving register connected to said user for storing data received from said common data bus.

17. The system of claim 16, including data memory means for storing replacement values and renewal interval recognition means for placing said replacement values in said receiving register if said receiving register has not received data from said common data bus within a predetermined time period after last receiving data from said common data bus.

18. The system of claim 17, wherein said replacement values placed in said receiving register are replaced by data when it is received from said common data bus.

19. The system of claim 1, including means for allowing said users to exchange data with said corresponding stations when data is not received from said data bus within a given time period.

20. The system of claim 1, wherein each said data has an identification tag for identifying said data to said receiving means, each said receiving means having identification means for recognizing said identification tag of data required by said user, with any or all of said receiving means able to receive the same said data.

21. The system of claim 20, wherein said identification means continuously scan said common data bus for required data.

22. The system of claim 1, further comprising bus control means for sequentially enabling each said transmission means to transmit said data to said data bus.

23. The system of claim 22, wherein each transmission means has a predetermined priority, and said bus control means of said transmission means with a highest priority upon initialization of said system controls said sequential enabling of lower priority transmission means.

24. The system of claim 23, wherein each transmission means includes a priority memory for storing said predetermined priority of said transmission means.

25. The system of claim 24, wherein each said control means includes counter means for sequential counting and supplying of a transmission command corresponding to a count to said data bus, the priority of each said transmission means corresponding to a certain count.

26. The system of claim 25, wherein each said transmission means includes a user recognition means which compares said transmission command with said predetermined priority and enables said transmission means if said transmission command corresponds to said predetermined priority.

27. The system of claim 1, wherein each of said receiving means includes data identification means for determining if data transmitted on said common data bus is required by said corresponding user according to said identification tag of each datum of said data on said common data bus.

28. The system of claim 29, wherein each of said receiving means includes data identification means for determining if data transmitted on said common data bus is required by said corresponding user according to said identification tag of each datum of said data on said common data bus.

29. A system controlling communications for a data bus used in vehicles, in which several users communicate with one another via a common data bus, comprising:
    individual station means for connecting each of said users to said common data bus for receiving and transmitting continuously variable lengths of data on said common data bus;
    receiving registers at each of said individual station means for storing data received and identified as required by said corresponding user of said individual station means,
    transmitting registers at each of said individual station means for individual storing and providing an identification tag for each datum of said continuously variable lengths of data as furnished from said corresponding user of said individual station means, a length of said continuously variable lengths of data being a function of a renewal rate specific to each datum of data furnished from said corresponding user and a frequency of transmission of data from said transmitting registers to said common bus line;
    receiving means at each of said station, constantly connected to said common data bus, for receiving and identifying data identified as required by said corresponding user of said station means based on said identification tag of each datum of data on said common data bus;
    data renewal interval control means at each of said individual station means for selectively determining the renewal rate for each datum of data generated by said corresponding user to an associated transmitting register based on an expected rate of change in value of each datum; and
    transmission means at each of said stations for transmitting sequentially said continuously variable lengths of data stored by an associated transmitting register at a frequency determined by a predetermined priority polling of each transmission means, the number of users connected to said common bus, and the time it takes for each of the transmission means to transmit data currently stored by the associate transmitting register upon polling, each transmission means being connected to said common data bus in accordance with an individually assigned predetermined priority for a continuously variable time interval equaling a length of time for transmission of each datum currently stored in said transmitting registers at the time of transmission by said transmission means.

30. The system of claim 29, further comprising bus control means for sequentially enabling each transmission means to transmit said data to said common data bus in accordance with said predetermined priority polling of each transmission means.

* * * * *